United States Patent
Kim et al.

(10) Patent No.: US 11,870,550 B2
(45) Date of Patent: Jan. 9, 2024

(54) ULTRA-LOW POWER DATA TRANSMISSION METHOD AND APPARATUS

(71) Applicant: ELECTRONICS AND TELECOMMUNICATIONS RESEARCH INSTITUTE, Daejeon (KR)

(72) Inventors: Pansoo Kim, Daejeon (KR); Soo Yeob Jung, Sejong-si (KR); Joon Gyu Ryu, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 67 days.

(21) Appl. No.: 17/361,575

(22) Filed: Jun. 29, 2021

(65) Prior Publication Data

US 2021/0409142 A1    Dec. 30, 2021

(30) Foreign Application Priority Data

Jun. 30, 2020    (KR) ......................... 10-2020-0079954

(51) Int. Cl.
*H04J 13/00* (2011.01)
*H04L 5/00* (2006.01)
(Continued)

(52) U.S. Cl.
CPC ........ *H04J 13/0051* (2013.01); *H04B 17/318* (2015.01); *H04B 17/327* (2015.01);
(Continued)

(58) Field of Classification Search
CPC ............... H04J 13/0051; H04J 13/0044; H04J 13/0029; H04J 13/0062; H04B 17/327;
(Continued)

(56) References Cited

U.S. PATENT DOCUMENTS

| 6,108,539 | A | * | 8/2000 | Ray | ............... | H04B 7/18506 |
| | | | | | | 455/430 |
| 2006/0281476 | A1 | * | 12/2006 | Lane | ............... | H04B 7/2125 |
| | | | | | | 455/70 |

(Continued)

FOREIGN PATENT DOCUMENTS

| CN | 104683993 A | * | 6/2015 | ......... H04B 7/18523 |
| WO | 2013/045761 A1 | | 4/2013 | |
| WO | 2018184900 A1 | | 10/2018 | |

OTHER PUBLICATIONS

Pansoo Kim et al., "Performance Analysis of Direct Sequence Spread Spectrum Aloha for LEO Satellite based IoT Service", 2019 IEEE 90th Vehicular Technology Conference, Sep. 23, 2019.

(Continued)

*Primary Examiner* — Shah M Rahman
(74) *Attorney, Agent, or Firm* — Rabin & Berdo, P.C.

(57) ABSTRACT

An ultra-low power data transmission method and apparatus are disclosed. An ultra-low power data transmission method to be performed by a user terminal of an ultra-low power data transmission system includes performing channel coding on a payload included in a transmission packet; interleaving a payload obtained through the channel coding, spreading the interleaved payload using a gold code and an orthogonal variable spreading factor (OVSF), combining a synchronization header spread using the gold code and the OVSF with the spread payload, and modulating a transmission packet in which the payload and the synchronization header are combined.

2 Claims, 5 Drawing Sheets

(51) Int. Cl.
  *H04B 17/327* (2015.01)
  *H04L 1/00* (2006.01)
  *H04L 27/00* (2006.01)
  *H04W 72/23* (2023.01)
  *H04B 17/318* (2015.01)

(52) U.S. Cl.
  CPC ........ *H04J 13/0044* (2013.01); *H04L 1/0063* (2013.01); *H04L 1/0071* (2013.01); *H04L 5/0048* (2013.01); *H04L 27/0014* (2013.01); *H04W 72/23* (2023.01); *H04L 2027/0065* (2013.01)

(58) Field of Classification Search
  CPC .. H04B 1/7073; H04B 17/309; H04B 17/318; H04B 17/21; H04L 1/0063; H04L 1/0071; H04L 5/0048; H04L 27/0014; H04L 2027/0065; H04L 1/0003; H04L 1/0009; H04L 1/0011; H04L 1/0054; H04L 12/66; H04L 25/0222; H04L 25/0224; H04L 27/2659; H04L 27/2665; H04L 27/2692; H04W 72/23; H04W 74/08; H04W 84/06; Y02D 30/50
  See application file for complete search history.

(56) References Cited

U.S. PATENT DOCUMENTS

| | | |
|---|---|---|
| 2009/0238202 A1 | 9/2009 | Myers |
| 2013/0058360 A1 | 3/2013 | Oh et al. |
| 2014/0016653 A1 | 1/2014 | Oh et al. |
| 2018/0316416 A1* | 11/2018 | Reis .......................... H01Q 3/02 |
| 2019/0075468 A1* | 3/2019 | Fujii .................. H04B 7/18539 |
| 2019/0285722 A1* | 9/2019 | Markhovsky ........... G01S 1/042 |
| 2020/0119808 A1* | 4/2020 | Parr ...................... H04L 1/1692 |
| 2020/0322042 A1* | 10/2020 | Rainish .............. H04B 7/18513 |
| 2020/0374976 A1* | 11/2020 | Dutta .................... H04W 16/14 |
| 2021/0044371 A1* | 2/2021 | Chen ................... H04J 13/0003 |
| 2021/0212124 A1* | 7/2021 | Wakabayashi .... H04W 74/0833 |
| 2021/0219228 A1* | 7/2021 | Matsuda .......... H04W 74/0833 |
| 2021/0242932 A1* | 8/2021 | Guibene .......... H04B 7/18513 |
| 2021/0392703 A1* | 12/2021 | Xu ...................... H04J 13/0062 |
| 2022/0018927 A1* | 1/2022 | Wigard ................. G01S 5/0258 |
| 2022/0191947 A1* | 6/2022 | Nishio ............. H04W 72/0466 |
| 2022/0217782 A1* | 7/2022 | Nishio ................ H04B 7/1851 |
| 2022/0248470 A1* | 8/2022 | Kang .................. H04W 72/044 |
| 2022/0278742 A1* | 9/2022 | Gineste ............. H04B 7/18517 |
| 2022/0377698 A1* | 11/2022 | Wang .................... G01S 13/765 |

OTHER PUBLICATIONS

Riccardo De Gaudenzi et al., "Random access schemes for satellite networks, from VSAT to M2M: a survey", International Journal of Satellite Communications and Networking Int. J. Satell. Commun. Network.(Dec. 15, 2016).

\* cited by examiner

ULTRA-LOW POWER DATA TRANSMISSION METHOD AND APPARATUS

CROSS-REFERENCE TO RELATED APPLICATION(S)

This application claims the priority benefit of Korean Patent Application No. 10-2020-0079954 filed on Jun. 30, 2020, in the Korean Intellectual Property Office, the disclosure of which is incorporated herein by reference for all purposes.

BACKGROUND

1. Field

One or more example embodiments relate to a method and apparatus for transmitting small-size data collected from various sensors used in a terrestrial network to a gateway anywhere in the world through terrestrial and satellite links.

2. Description of Related Art

In fifth-generation (5G) communication that is recently drawing attention, the construction of a network capable of accommodating massive internet of things (IoT) is included as a requirement. IoT objects (e.g., user terminals) on the ground may have a form of access, which is not an existing network protocol, when these objects transmit various types of collected data or state information of the objects to a gateway.

The IoT objects may have access to the gateway through a satellite network when the objects are present in marine or mountainous areas that a terrestrial network may not reach, instead of urban areas. In a case of a typical satellite network, most user terminals may have access to the gateway with allocated time and frequency resources. Alternatively, a competition-based access method may be adopted for initial access. However, such cases may only be possible under the assumption that there are not numerous user terminals.

When the number of user terminals increases and channels between the user terminals are not separated in time and frequency domains, a probability of successful data reception, or a data reception success probability, may decrease, and thus an additional operation such as data re-transmission may be required. Such an additional operation as data re-transmission may result in a great time delay including a data transmission delay and a ground-satellite delay, thereby limiting a service. However, when the gateway does not receive data, there may be a service that does not require data re-transmission among satellite IoT services. That is, the service may transmit data needed by a user, for example, state information or location information of a user terminal, irrespective of such a time delay.

SUMMARY

An aspect relates to an ultra-low power data transmission system that has access to a terrestrial network and uses a satellite to transmit data in an area in which the terrestrial network is not present, and provides a method and apparatus that may improve a transmission efficiency in an environment with an extremely low signal-to-noise ratio (SNR).

Another aspect also provides a method and apparatus that may increase a reception rate in a case of low power-based access by an internet of things (IoT) terminal in a large network in which small satellite IoT terminals are established.

According to an example embodiment, there is provided an ultra-low power data transmission method to be performed by a user terminal of an ultra-low power data transmission system. The ultra-low power data transmission method may include receiving downlink signals respectively through a satellite network and a terrestrial network, identifying received power of each of the received downlink signals, and transmitting, to a gateway, collected data through one of the satellite network and the terrestrial network based on the identified received power of the downlink signals. The transmitting may be performed using a different channel code and a preamble sequence based on a type of the network to be used for the transmitting.

The transmitting may include transmitting the collected data through a network corresponding to a downlink signal having greater received power based on the identified received power of the downlink signals.

When the collected data is transmitted through the satellite network, the transmitting may include estimating channel error information corresponding to a Doppler frequency error and a carrier frequency error through a downlink signal including control information and a pilot signal that is received from a satellite, determining a transmission method for correcting the Doppler frequency error and the carrier frequency error based on the estimated and channel error information, and transmitting, to the gateway, the collected data through the satellite network by first correcting the estimated and channel error information using the determined transmission method.

The transmission method may include at least one of a modulation method, a channel code rate-based method, or a transmission power-based method.

According to another example embodiment, there is provided an ultra-low power data transmission method to be performed by a user terminal of an ultra-low power data transmission system. The ultra-low power data transmission method may include, for transmitting collected data through a satellite network, performing channel coding on a payload included in a transmission packet having a predetermined length, interleaving a payload obtained through the channel coding, spreading the interleaved payload using a gold code and an orthogonal variable spreading factor (OVSF), spreading a preamble sequence of a synchronization header included in the transmission packet using the gold code and the OVSF, combining a synchronization header including the spread preamble sequence with the spread payload, and modulating a transmission packet in which the payload and the synchronization header are combined.

The performing of the channel coding may include performing the channel coding on the payload included in the transmission packet using at least one channel code among a convolutional code, a turbo code, a low-density parity-check code (LDPC), and a polar code.

The modulating may include performing a differential modulation on the transmission packet in which the payload and the synchronization header are combined based on strength of the downlink signal received from a satellite or availability of a nearby terrestrial network.

The modulating may include modulating the transmission packet in which the payload and the synchronization header are combined through a coherent pi/2 binary phase-shift keying (BPSK) modulation.

The ultra-low power data transmission method may further include transmitting the modulated transmission packet to a gateway of the terrestrial network through the satellite.

The transmitting may include transmitting the modulated transmission packet to the gateway using a spread-spectrum additive links online Hawaii area (ALOHA) (SSA) method.

According to still another example embodiment, there is provided an ultra-low power data reception method to be performed by a gateway of an ultra-low powder data transmission system. The ultra-low power data reception method may include identifying a transmission packet received through a satellite using a preamble of the transmission packet, performing a coarse synchronization on the identified transmission packet, de-spreading a transmission packet obtained through the coarse synchronization, performing a fine synchronization on the despread transmission packet, calculating a log-likelihood ratio (LLR) of a transmission packet obtained through the fine synchronization, de-interleaving the transmission packet based on the calculated LLR, and performing channel decoding on the de-interleaved transmission packet.

The transmission packet received through the satellite may be a transmission packet in which a payload is obtained through channel coding using a convolutional code, a turbo code, an LDPC, a polar code, or the like.

The transmission packet received through the satellite may be a transmission packet that is modulated through a differential modulation or a coherent pi/2 BPSK modulation.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the present disclosure will become apparent and more readily appreciated from the following description of example embodiments, taken in conjunction with the accompanying drawings of which.

DETAILED DESCRIPTION

Hereinafter, example embodiments will be described in detail with reference to the accompanying drawings. However, various alterations and modifications may be made to the examples. Here, the examples are not construed as limited to the disclosure and should be understood to include all changes, equivalents, and replacements within the idea and the technical scope of the disclosure.

The terminology used herein is for the purpose of describing particular examples only and is not to be limiting of the examples. As used herein, the singular forms "a," "an," and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms, including technical and scientific terms, used herein have the same meaning as commonly understood by one of ordinary skill in the art to which this disclosure pertains consistent with and after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

In the description of example embodiments, detailed description of structures or functions that are thereby known after an understanding of the disclosure of the present application will be omitted when it is deemed that such description will cause ambiguous interpretation of the example embodiments.

In addition, terms such as first, second, A, B, (a), (b), and the like may be used herein to describe components. Each of these terminologies is not used to define an essence, order, or sequence of a corresponding component but used merely to distinguish the corresponding component from other component(s). Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

Hereinafter, example embodiments will be described in detail with reference to the accompanying drawings. Regarding the reference numerals assigned to the elements in the drawings, it should be noted that the same elements will be designated by the same reference numerals, wherever possible, even though they are shown in different drawings.

Figure 1:
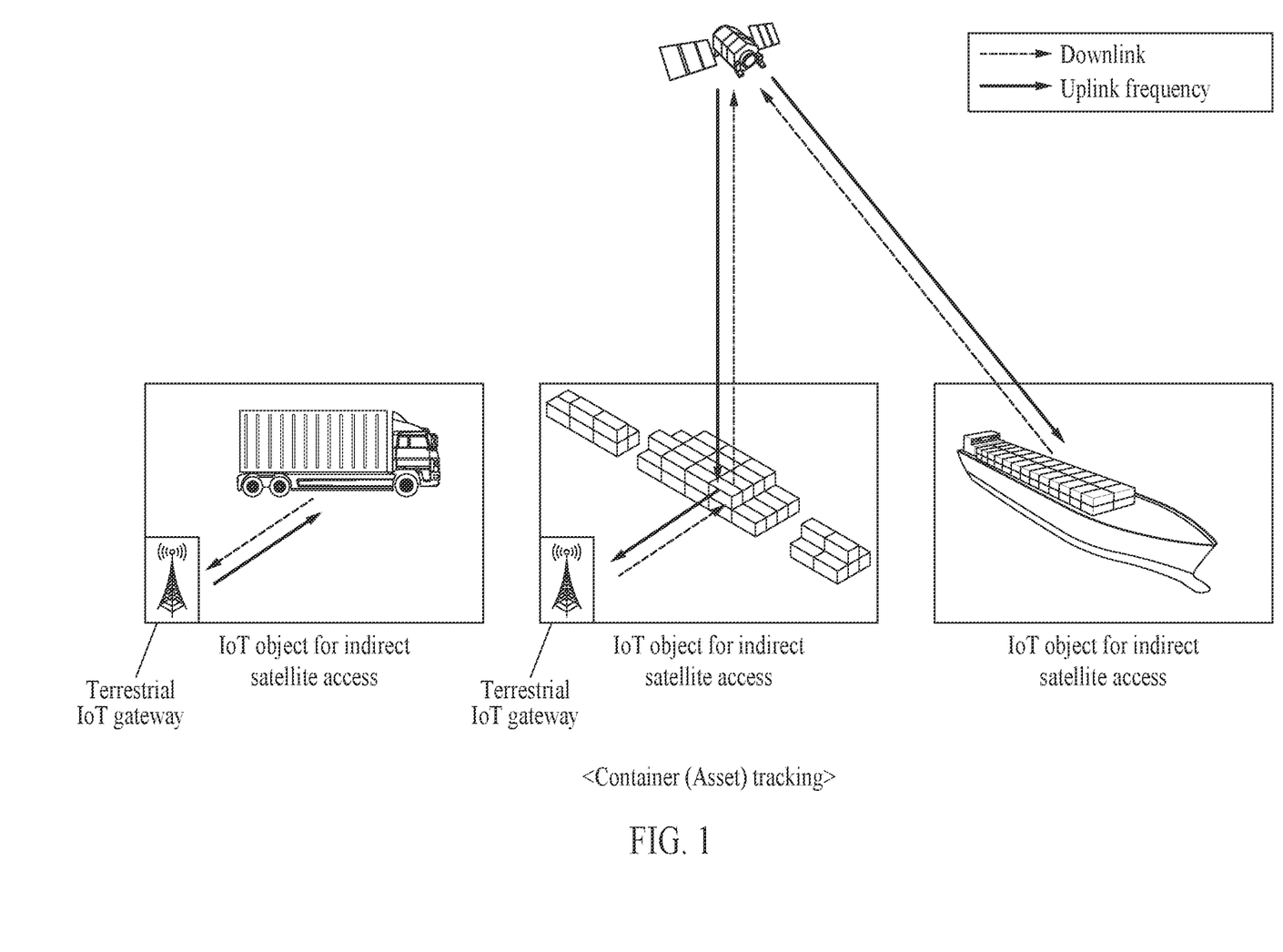
FIG. 1 is a diagram illustrating an example of internet of things (IoT) access through a satellite and a terrestrial network according to an example embodiment.

FIG. 1 is a diagram illustrating an example of internet of things (IoT) access through a satellite and a terrestrial network according to an example embodiment.

A satellite-based global asset tracking service will be described as an example hereinafter with reference to FIG. 1. For example, a global freight company may need to construct a monitoring system that tracks freight containers for international trade. For this, an IoT terminal may be attached to one side of a freight container, and provide current location information and state information to a gateway located in a terrestrial network through a satellite at a predetermined time.

In general, when the terrestrial network is in a desirable environment, the IoT terminal may transmit data directly to the gateway using a terrestrial IoT transmission method. However, in a case in which the freight container is out of a range of the terrestrial network, for example, when the freight container is on a marine vessel, the IoT terminal may transmit collected data through the satellite in a form of a relay.

An IoT terminal may transmit data by using one transmission modem when satellite and terrestrial networks use the same frequency band and using two modems when the satellite and terrestrial networks use different frequency bands. The IoT terminal may identify power of signals received from outside, and determine whether a signal with great power is a signal of the terrestrial network or a signal of the satellite network. Such a determination may be performed at an analog receiving end of the IoT terminal when the satellite and terrestrial networks use different frequency bands. However, when the satellite and terrestrial networks use the same frequency band, the IoT may determine the signal by extracting network identification (ID) information of each network.

Figure 2:
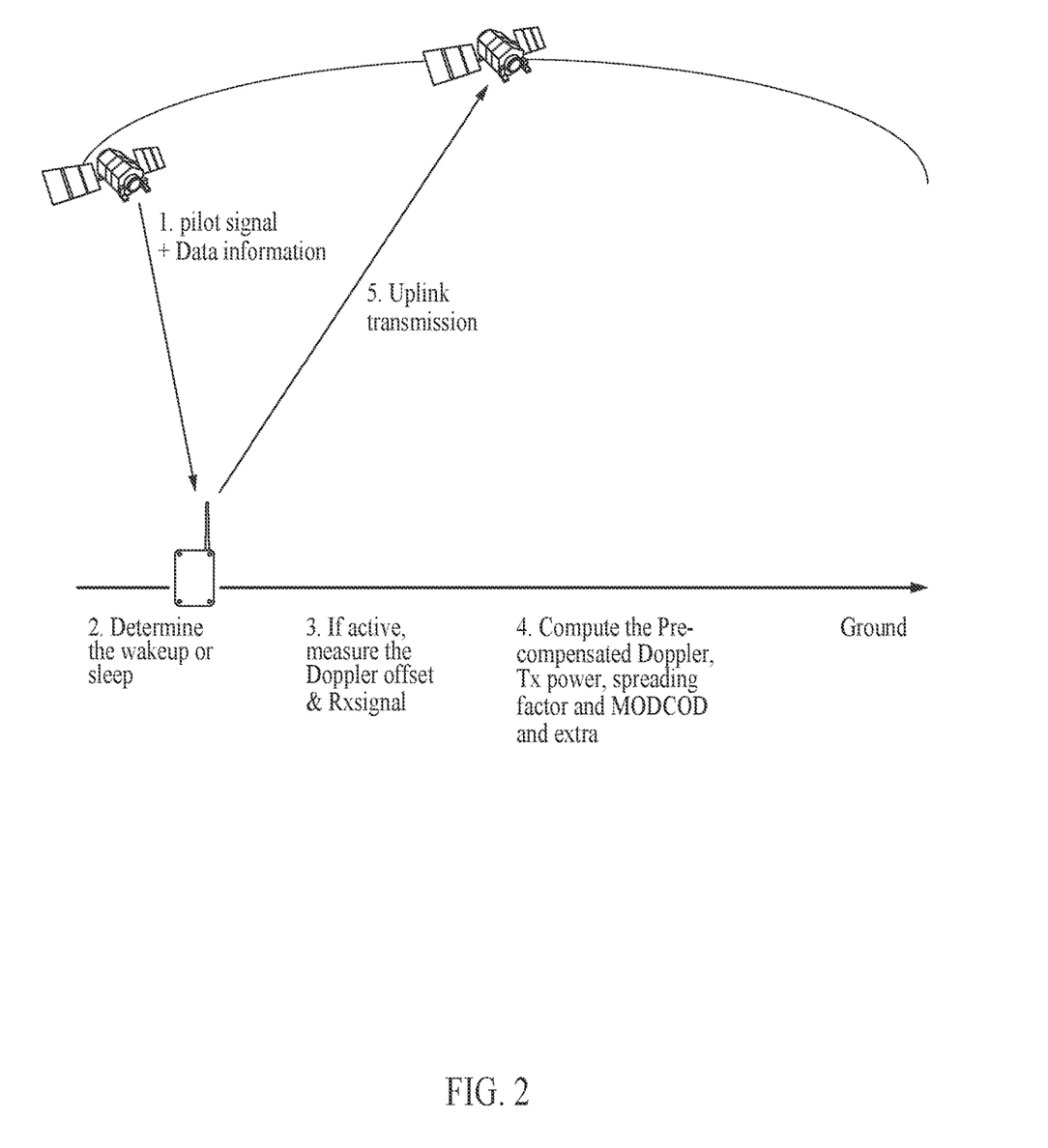
FIG. 2 is a diagram illustrating an example of a transmission protocol between a satellite and an IoT terminal according to an example embodiment.

FIG. 2 is a diagram illustrating an example of a transmission protocol between a satellite and an IoT terminal according to an example embodiment.

Referring to FIG. 2, a satellite may transmit, to an IoT terminal, a downlink signal including a pilot signal and a small control signal (e.g., network ID information) on a forward link (e.g., a link of a transmission from the satellite to the IoT terminal), to wake up the IoT terminal on the ground. The downlink signal to be received by the IoT terminal from the satellite may need to be a signal that is robust against a frequency error and a channel error, and may thus have a form of a chirp signal.

The IoT terminal may determine whether to transmit information of the IoT terminal based on the downlink signal received from the satellite. For example, the IoT terminal may identify received power of a downlink signal received through a satellite network and a terrestrial network, respectively. When the received power of the downlink signal received through the satellite network is greater than the received power of the downlink signal received through the terrestrial network, the IoT terminal may determine to transmit the information of the IoT terminal, for example, information collected through a sensor and the like, through the satellite network.

Subsequently, the IoT terminal may estimate channel error information corresponding to a Doppler frequency error and a carrier frequency error using the pilot signal received through the forward link. The IoT terminal may determine a transmission method, such as, for example, a modulation method, a channel code rate-based method, and a transmission power-based method, using the estimated channel error information, correct first an estimated channel error value, and then transmit the collected information to the satellite.

The IoT terminal may select the modulation method and a channel code based on a variation in the Doppler frequency error that may occur due to a movement of the satellite and a received signal-to-noise ratio (SNR) (or a received signal sensitivity). For example, when the variation in the Doppler frequency error is great and the received SNR is high, the IoT terminal may use a differential binary phase-shift keying (BPSK) modulation method and a convolution code. In contrast, when the variation in the Doppler frequency error is small and the received SNR is low, the IoT terminal may use a coherent modulation method and a turbo code.

Figure 3A:
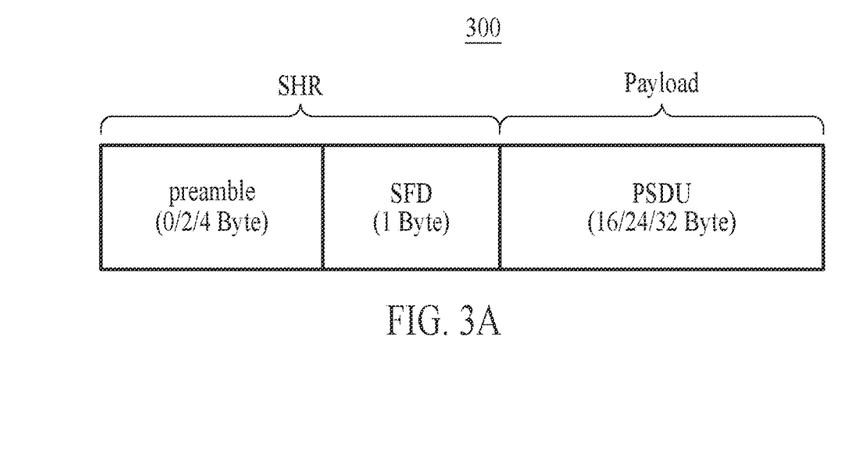
FIGS. 3A and 3B are diagrams illustrating an example of ultra-low power data transmission performed by a user terminal of an ultra-low power data transmission system using a satellite according to an example embodiment.
Figure 3B:
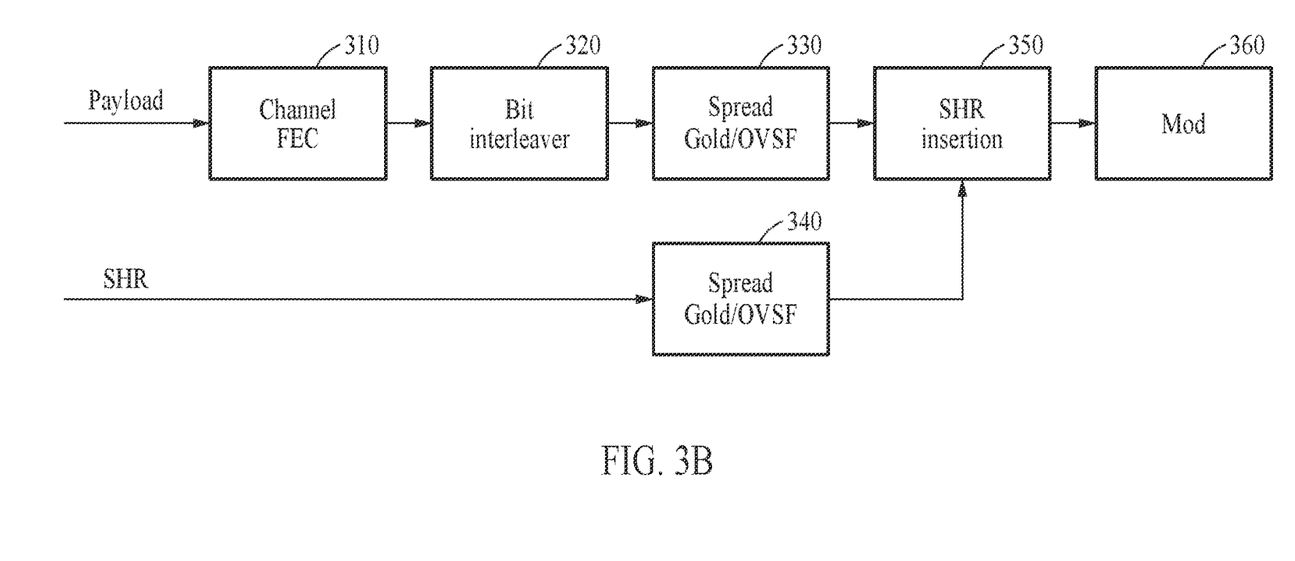

FIGS. 3A and 3B are diagrams illustrating an example of ultra-low power data transmission performed by a user terminal of an ultra-low power data transmission system using a satellite according to an example embodiment.

An IoT terminal (e.g., a user terminal) may transmit data in an unslotted access method due to issues, such as, for example, a long time delay between a satellite and a ground and a distribution of a great number of user terminals. When there are a great number of data transmissions due to such an unslotted method, a received throughput may be reduced due to a collision between users.

To improve such a collision issue, a spread-spectrum additive links online Hawaii area (ALOHA) (SSA) method may be used. The SSA method may reduce a transmission power density for a transmission and reduce an influence of a collision between users even when the collision occurs. For example, an IEEE 802.15.4k method, which is the Institute of Electrical and Electronics Engineers (IEEE) standard for local and metropolitan area networks—part 15.4: low-rate wireless personal area networks (LR-WPANs), may be used.

FIG. 3A illustrates a transmission packet including a synchronization header (SHR as illustrated) and a payload. The synchronization header may include a 2- or 4-byte long preamble and a 1-byte long start of frame delimiter (SFD as illustrated). A field of the preamble, or a preamble field, may be used to facilitate a packet detection process in a receiver of a gateway, and thus a preamble having a desirable autocorrelation characteristic may need to be selected. For example, a gold code sequence may be used.

FIG. 3B illustrates ultra-low power data transmission. An ultra-low power data transmission apparatus 300 may perform channel coding on the payload included in the transmission packet using channel forward error correction (FEC) in step 310. The ultra-low power data transmission apparatus 300 may perform the channel coding on the payload included in the transmission packet by applying, to the channel FEC, at least one channel code among a convolutional code, a turbo code, a low-density parity-check code (LDPC), and a polar code.

The ultra-low power data transmission apparatus 300 may perform interleaving that randomly spreads, in a time or frequency domain, a bit error that may occur in a payload obtained through the channel coding, using a bit interleaver in step 320.

The ultra-low power data transmission apparatus 300 may spread the interleaved payload using a gold code sequence and an orthogonal variable spreading factor (OVSF) in step 330. The ultra-low power data transmission apparatus 300 may then spread a preamble of the synchronization header included in the transmission packet using the gold code sequence and the OVSF in step 340. As a preamble sequence generated before step 340, a Zadoff-Chu sequence, a Bjorck sequence, or the like may be applied in addition to a preamble sequence provided in an IEEE 802.15.4k standard which is the IEEE standard for local and metropolitan area networks—part 15.4.

Subsequently, in step 350, the ultra-low power data transmission apparatus 300 may combine a synchronization header including the preamble that is spread in step 340 with the payload that is spread in step 330. The ultra-low power data transmission apparatus 300 may then modulate a transmission packet in which the payload and the synchronization header are combined through a modulator in step 360. The modulator of the ultra-low power data transmission apparatus 300 may modulate the transmission packet in which the payload and the synchronization header are combined by using a coherent BPSK modulation because a channel error corresponding to a Doppler frequency error and a carrier frequency error is previously corrected in a forward link and there is thus a relatively lower channel error. For example, the ultra-low power data transmission apparatus 300 may modulate the transmission packet using a pi/2 BPSK modulation which is a type of the coherent BPSK modulation, thereby reducing a peak-to-average power ratio (PAPR).

Alternatively, in a case in which a differential BPSK modulation is used, as in the IEEE 802.15.4k standard, for a nearby available terrestrial network, the ultra-low power data transmission apparatus 300 may modulate the transmission packet using the differential BPSK modulation. The differential BPSK modulation may be effective in that, compared to when using the coherent modulation method, a receiver may be robust against a Doppler and the structure of the receiver may be simplified.

The ultra-low power data transmission apparatus 300 may transmit the modulated transmission packet to the gateway of the terrestrial network through the satellite.

Figure 4:
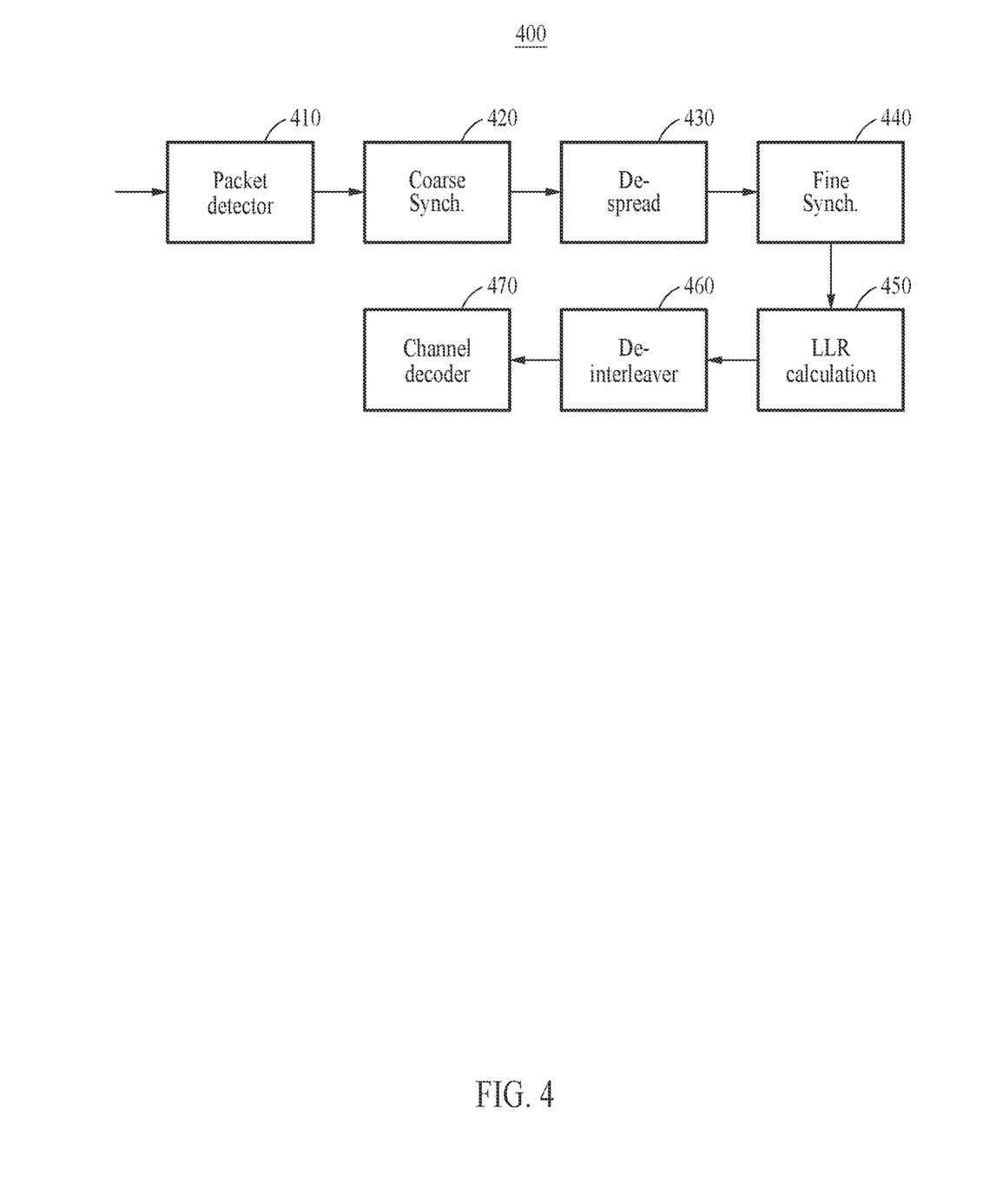
FIG. 4 is a diagram illustrating an example of ultra-low power data reception performed by a gateway of an ultra-low power data transmission system using a satellite according to an example embodiment.

FIG. 4 is a diagram illustrating an example of ultra-low power data reception performed by a gateway of an ultra-low power data transmission system using a satellite according to an example embodiment.

Referring to FIG. 4, an ultra-low power data reception apparatus 400 of a gateway may identify a transmission packet received through a satellite using a packet detector in step 410. The packet detector may identify the received transmission packet using a preamble.

The ultra-low power data reception apparatus 400 may perform coarse synchronization on the transmission packet detected through the packet detector in step 420, and then de-spread a transmission packet obtained through the coarse synchronization in step 430.

Subsequently, the ultra-low power data reception apparatus 400 may perform fine synchronization on the de-spread transmission packet in step 440, and then perform a log-likelihood ratio (LLR) calculation in step 450.

Subsequently, the ultra-low power data reception apparatus 400 may perform de-interleaving on the transmission packet based on the calculated LLR through a de-interleaver in step 460, and then perform channel decoding on the de-interleaved transmission packet through a channel decoder in step 470.

Figure 5:
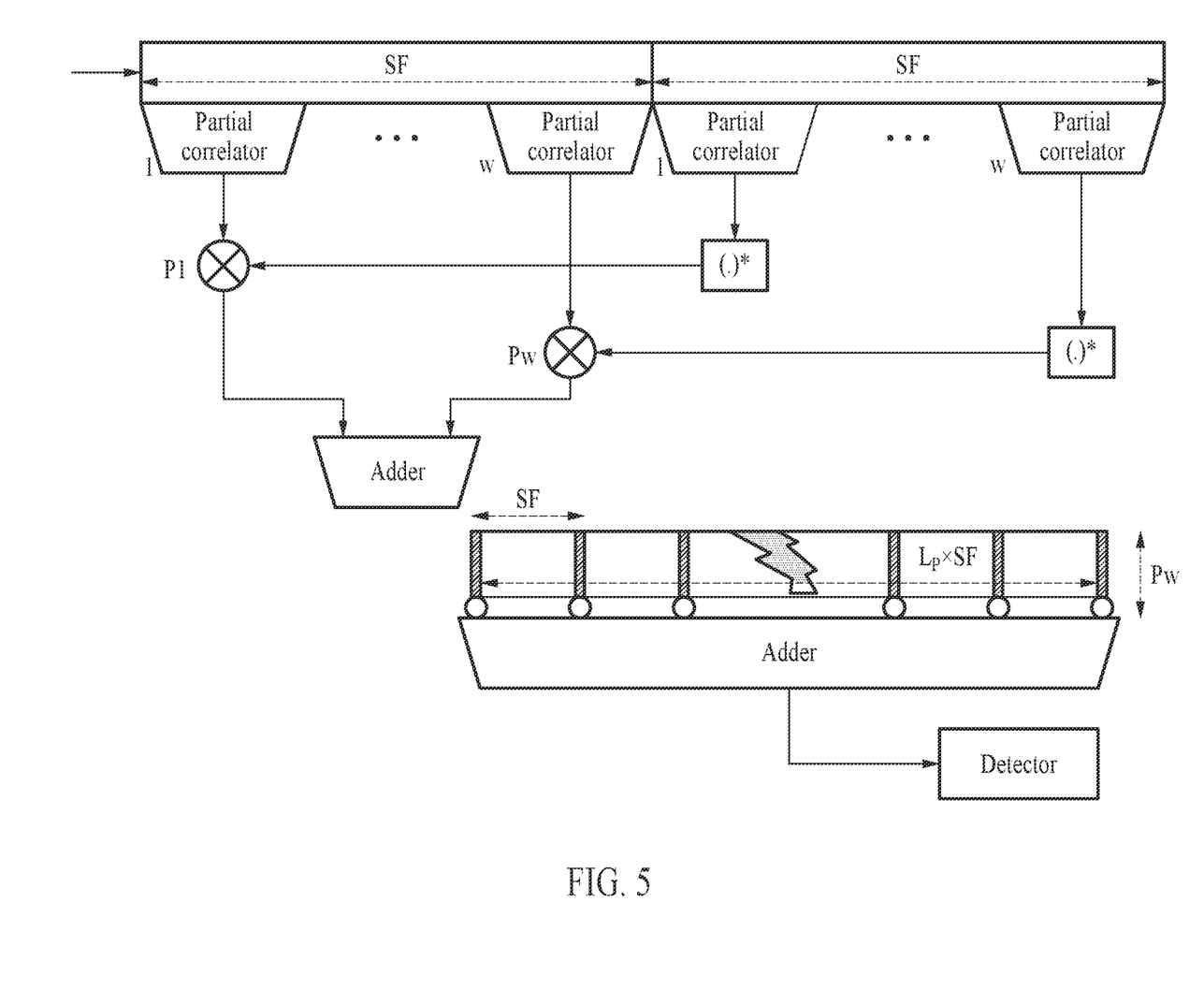
FIG. 5 is a diagram illustrating an example of a method of designing a packet detector according to an example embodiment.

FIG. 5 is a diagram illustrating an example of a method of designing a packet detector according to an example embodiment.

The ultra-low power data reception apparatus 400 may require a robust packet detector and a coarse synchronization algorithm, for example, the packet detector and the coarse synchronization that are described above with reference to FIG. 4. Using a pre-designed correlator, a correlation output value between a signal received from a satellite and a previously known preamble sequence may be derived. When the derived correlation output value is considerably greater than a predetermined threshold value, an accurate Doppler may be estimated in the step of the coarse synchronization.

For example, the correlator may be designed as illustrated in FIG. 5, and an operating SNR range may be derived as represented by Equation 1 below. In a final detector stage, an SNR may be calculated as follows.

$$SNR_{dB} = 3\log_2 L_p + 2\cdot(E_c/N_o)_{dB} + 6\log_2 SF - 3\log_2 w \quad \text{[Equation 1]}$$

In Equation 1 above, $L_p$ denotes a preamble length. SF denotes a spreading factor. $E_c/N_o$ denotes received energy per chip that is divided by noise power density in a band. w denotes a partial correlation length.

Each transmission packet may start with a preset preamble pattern, and all symbols of the preamble pattern may be spread to an SF time by an SF, a gold sequence, and an orthogonal sequence. Here, it is assumed that a gold code generator of a modulator is initialized for each symbol. Thus, all the symbols of the preamble may have the same sequence to reduce the complexity of the packet detector. Thus, the packet detector using the preamble symbol may be simplified as illustrated in FIG. 5.

To design the packet detector, a partial coherent correlation, a cross-multiplication, and an accumulation operation in a time domain may be used to increase an SNR value. In addition, a fast Fourier transform (FFT)-based energy calculation in a frequency domain may be used to implement a correlation process and a Doppler estimation for a less sensitive Doppler shift.

According to example embodiments described herein, there is provided an ultra-low power data transmission system that has access to a terrestrial network and uses a satellite to transmit data in an area in which the terrestrial network is not present, and it is thus possible to improve a transmission efficiency in an extremely low SNR environment.

In addition, in a large network in which small satellite IoT terminals are present, it is possible to increase a reception rate when an IoT terminal has low-power based access.

The units described herein may be implemented using hardware components and software components. For example, the hardware components may include microphones, amplifiers, band-pass filters, audio to digital convertors, non-transitory computer memory and processing devices. A processing device may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums. The non-transitory computer readable recording medium may include any data storage device that can store data which can be thereafter read by a computer system or processing device.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. An ultra-low power data transmission method to be performed by a user terminal of an ultra-low power data transmission system, the ultra-low power data transmission method comprising:

receiving downlink signals through a satellite network and a terrestrial network, respectively;

identifying received power of each of the received downlink signals; and transmitting, to a gateway, collected data through one of the satellite network and the terrestrial network based on the identified received power of the downlink signals, wherein the transmitting is performed using a different channel code and a preamble sequence based on a type of the network to be used for the transmitting;

wherein the transmitting comprises:

when the collected data is transmitted through the satellite network, estimating channel error information corresponding to a Doppler frequency error and a carrier frequency error through a downlink signal comprising control information and a pilot signal that is received from a satellite;

determining a transmission method for correcting the Doppler frequency error and the carrier frequency error based on the estimated and computed channel error information; and transmitting, to the gateway, the collected data through the satellite network by first correcting the estimated and computed channel error information using the determined transmission method;

wherein the transmission method comprises at least one of a modulation method, a channel code rate-based method, or a transmission power-based method; and wherein the ultra-low power data transmission method further comprises:

selecting, as the modulation method and the channel code, respectively, a differential binary phase-shift keying (BPSK) modulation method and a convolution code, based on a first amount of variation in the Doppler frequency error and a first amount of received signal-to-noise ratio (SNR); and selecting, as the modulation method and the channel code, respectively, a coherent modulation method and a turbo code, based on a second amount of variation in the Doppler frequency error and a second amount of received SNR;

wherein the first amount is greater than the second amount.

2. The ultra-low power data transmission method of claim 1, wherein the transmitting comprises:

transmitting the collected data through a network corresponding to a downlink signal having greater received power based on the identified received power of the downlink signals.

* * * * *